(12) United States Patent
Liang

(10) Patent No.: US 7,313,235 B2
(45) Date of Patent: *Dec. 25, 2007

(54) DEVICE AND METHOD OF APPLYING A PARITY TO ENCRYPT DATA FOR PROTECTION

(75) Inventor: Bor-Sung Liang, Kaohsiung (TW)

(73) Assignee: Sunplus Technology Co., Ltd. (TW)

( * ) Notice: Subject to any disclaimer, the term of this patent is extended or adjusted under 35 U.S.C. 154(b) by 568 days.

This patent is subject to a terminal disclaimer.

(21) Appl. No.: 10/919,296

(22) Filed: Aug. 17, 2004

(65) Prior Publication Data

US 2005/0050436 A1 Mar. 3, 2005

(30) Foreign Application Priority Data

Aug. 28, 2003 (TW) .............................. 92123817 A

(51) Int. Cl.
*H04K 1/02* (2006.01)
*G09C 5/00* (2006.01)

(52) U.S. Cl. ..................... 380/28; 714/752; 714/800

(58) Field of Classification Search .................. 380/28; 714/800; G09C 5/00
See application file for complete search history.

(56) References Cited

U.S. PATENT DOCUMENTS

| 4,507,783 | A | * | 3/1985 | Austin et al. ................ 714/801 |
| 4,661,980 | A | * | 4/1987 | Byram ........................ 380/46 |
| 6,888,944 | B2 | * | 5/2005 | Lotspiech et al. .......... 380/269 |
| 2003/0076870 | A1 | * | 4/2003 | Moon et al. ................. 375/130 |

OTHER PUBLICATIONS

Callahan, RW; Encrypting Decrypting Communication Link; May 1, 1977; IBM TDB 05-77; pp. 4564-4568.*

* cited by examiner

*Primary Examiner*—R. Stephen Dildine
(74) *Attorney, Agent, or Firm*—Bacon & Thomas, PLLC

(57) ABSTRACT

A device and method of applying a parity to encrypt data for protection is disclosed. A parity generator generates a parity bit in accordance with a data to be outputted. A first parity location generator generates an inserting position N for the parity bit in accordance with a predetermined algorithm. A parity-inserting unit inserts the parity bit in a position between (N−1)th- and Nth-bit of the data in accordance with the inserting position N, thereby generating an encrypted data.

24 Claims, 5 Drawing Sheets

DEVICE AND METHOD OF APPLYING A PARITY TO ENCRYPT DATA FOR PROTECTION

BACKGROUND OF THE INVENTION

1. Field of the Invention

The present invention relates to the technical field of data encryption and, more particularly, to a device and method of applying a parity operation to encrypt data for protection.

2. Description of Related Art

Due to the importance of intellectual properties, manufactories typically encrypt their intellectual property (IP) related data, including programs, off-line for data protection and store the data encrypted in a non-volatile memory or storage medium, such that an unauthorized person cannot restore the data even if he/she obtains the memory or storage medium with the data encrypted.

U.S. Pat. No. 6,408,073 granted to Hsu, et al. for an "Scramble circuit to protect data in a read only memory" discloses a scramble circuit for protecting data stored in a read-only memory (ROM) by applying both a pseudo-random generator and an initial value seed1/seed2 to code ROM data and thus generates encoded data. However, since the scrambling technology uses random numbers as parameters, such a data protection method requires a synchronous random generator for decoding. It also needs many patterns of random numbers to effectively prevent an unauthorized person from retrieving data, programs, which means that a pseudo random generator for encoding and decoding needs highly complicated circuitry. Thus, the cost increases dramatically. On the contrary a simpler pseudo random generator for encoding and decoding can be used to save the cost, but in this way, data and programs can be retrieved by an unauthorized person easily.

Therefore, it is desirable to provide an improved device and method to mitigate and/or obviate the aforementioned problems.

SUMMARY OF THE INVENTION

The object of the present invention is to provide a device and method of applying a parity operation to encrypt data for protection, thereby avoiding complicated pseudo random generator in the prior art and thus saving cost, as well as avoiding access increasing cycle of processor in the prior art and thus enhancing performance.

In accordance with one aspect of the present invention, there is provided a device of applying a parity operation to encrypt data for protection. The device includes: a parity generator, a first parity location generator and a parity-inserting unit. The parity generator generates a parity bit in accordance with a data to be outputted, wherein the data has a plurality of bits. The first parity location generator generates an inserting position N (positive integer) for the parity in accordance with a predetermined algorithm. The parity-inserting unit inserts the parity bit in a position between (N−1)th- and Nth-bit of the data in accordance with the inserting position N, thereby generating an encrypted data.

In accordance with another aspect of the present invention, there is provided a method of applying a parity operation to encrypt data for protection. The method includes: (A) generating a parity bit in accordance with a data to be outputted, wherein the data has a plurality of bits; (B) generating an inserting position N (positive integer) for the parity bit in accordance with a predetermined algorithm; (C) inserting the parity bit in a position between (N−1)th- and Nth-bit of the data in accordance with the inserting position N generated at step (B), thereby generating an encrypted data.

In accordance with still another object of the present invention, there is provided a device of applying check bits to encrypt data for protection. The device includes: a check bit generator, which generates P check bits through a check algorithm device in accordance with a data to be outputted, where P is an integer greater than or equal to 1; a first check bit location generator, which generates inserting positions $N_1, \ldots, N_P$ (a positive integer respectively for N, P) for the P check bits in accordance with a predetermined algorithm; and a check bit inserting unit, which inserts the P check bits respectively in a position between $(N_x-1)$th- and $(N_x)$th-bit of the data in accordance with the inserting positions $N_1, \ldots, N_P$ generated by the first check bit location generator, where x=1, . . . , P, thereby generating an encrypted data.

In accordance with further another object of the present invention, there is provided a method of applying check bits to encrypt data for protection. The method includes: (A) generating P check bits through a check algorithm device in accordance with a data to be outputted, where P is an integer greater than or equal to 1; (B) generating inserting positions $N_1, \ldots, N_P$ (a positive integer respectively for N, P) for the P check bits in accordance with a predetermined algorithm; and (C) inserting the P check bits respectively in a position between $(N_x-1)$th- and $(N_x)$th-bit of the data in accordance with the inserting positions $N_1, \ldots, N_P$ generated at step (B), where x=1, . . . , P, thereby generating an encrypted data.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
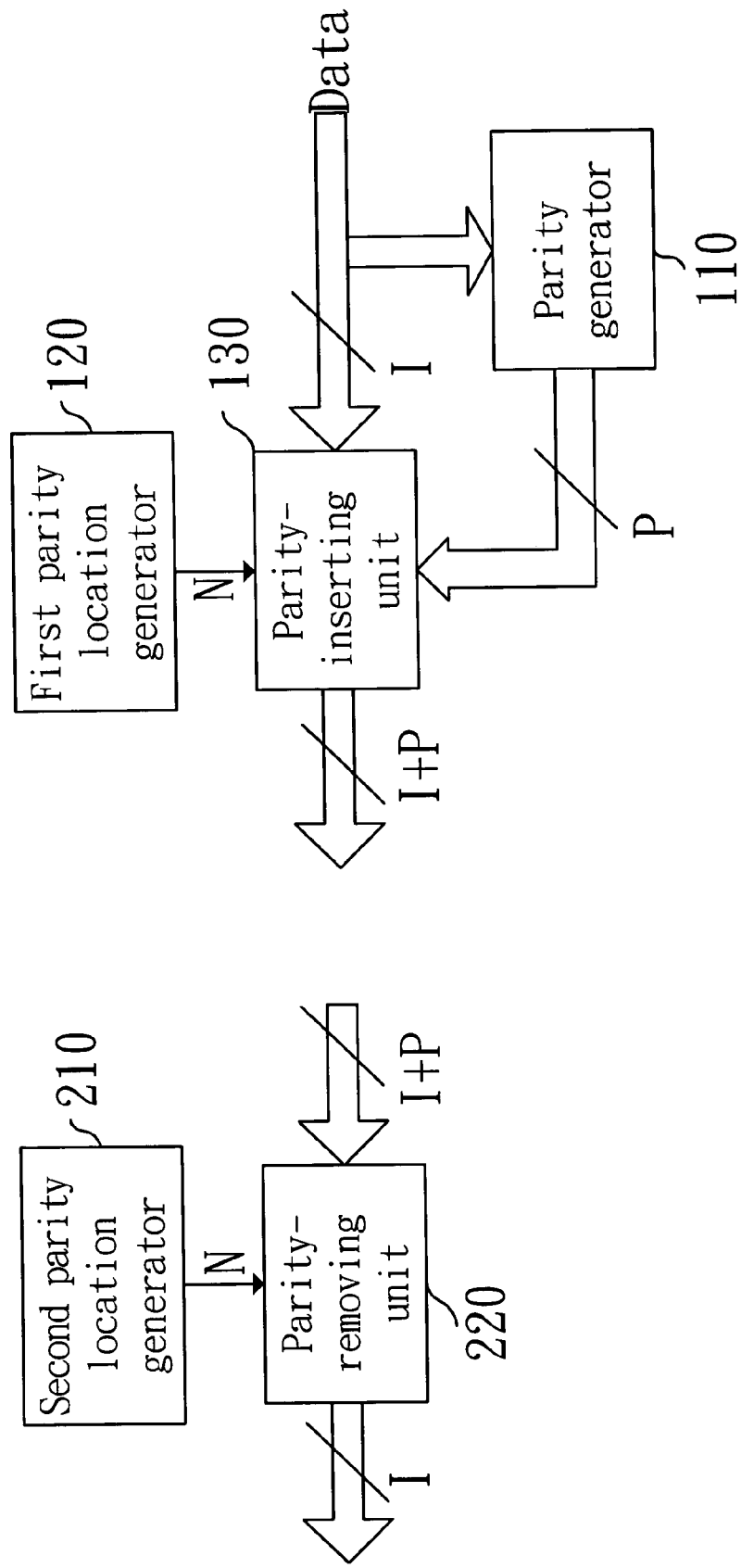
FIG. 1 is a block diagram of a device of applying a parity operation to encrypt data for protection in accordance with the invention.

FIG. 1 is a block diagram of a device of applying a parity to encrypt data for protection in accordance with the invention. In FIG. 1, the device includes: a parity generator 110, a first parity location generator 120, a parity-inserting unit 130, a second parity location generator 210 and a parity-removing unit 220. As shown in FIG. 1, the parity generator 110, the first parity location generator 120 and the parity-inserting unit 130 encrypt data to be outputted. In addition, the second parity location generator 210 and the parity-removing unit 220 decrypt the data. The parity generator 110 generates P parity bits in accordance with I-bit data to be outputted. For simple description, 8 bits are applied for the I-bit data (I=8) and only one bit is applied for the P parity bit (P=1). The 8-bit data is processed by an XOR gate with eight input terminals and one output terminal, thus the parity is obtained.

The first parity location generator 120 generates an inserting position N for the parity in accordance with a predetermined algorithm. For example, the inserting position N is obtained by computing a function of f(K) with a key, i.e., the integer N represents a position where the parity is located in the 8-bit data.

The parity-inserting unit 130 inserts the parity bit in a position between (N−1)th- and Nth-bit of the 8-bit data in accordance with the inserting position N, thereby generating a 9-bit (I+P) encrypted data.

The integer N can further be generated by performing a function of right rotation or left rotation. Thus, randomness of the inserting position N is increased and accordingly the inserting position cannot be obtained easily by reverse inference.

The second parity location generator 210 also generates the inserting position N for the parity in accordance with the predetermined algorithm. Namely, the inserting position N is obtained by computing the function of f(K) with the key, and thus the integer N represents where the parity is located in the 9-bit encrypted data. The parity-removing unit 220 receives the 9-bit encrypted data and removes the Nth bit from the 9-bit encrypted data in accordance with the inserting position N generated by the second parity location generator 210, thereby obtaining the decrypted data.

Figure 2:
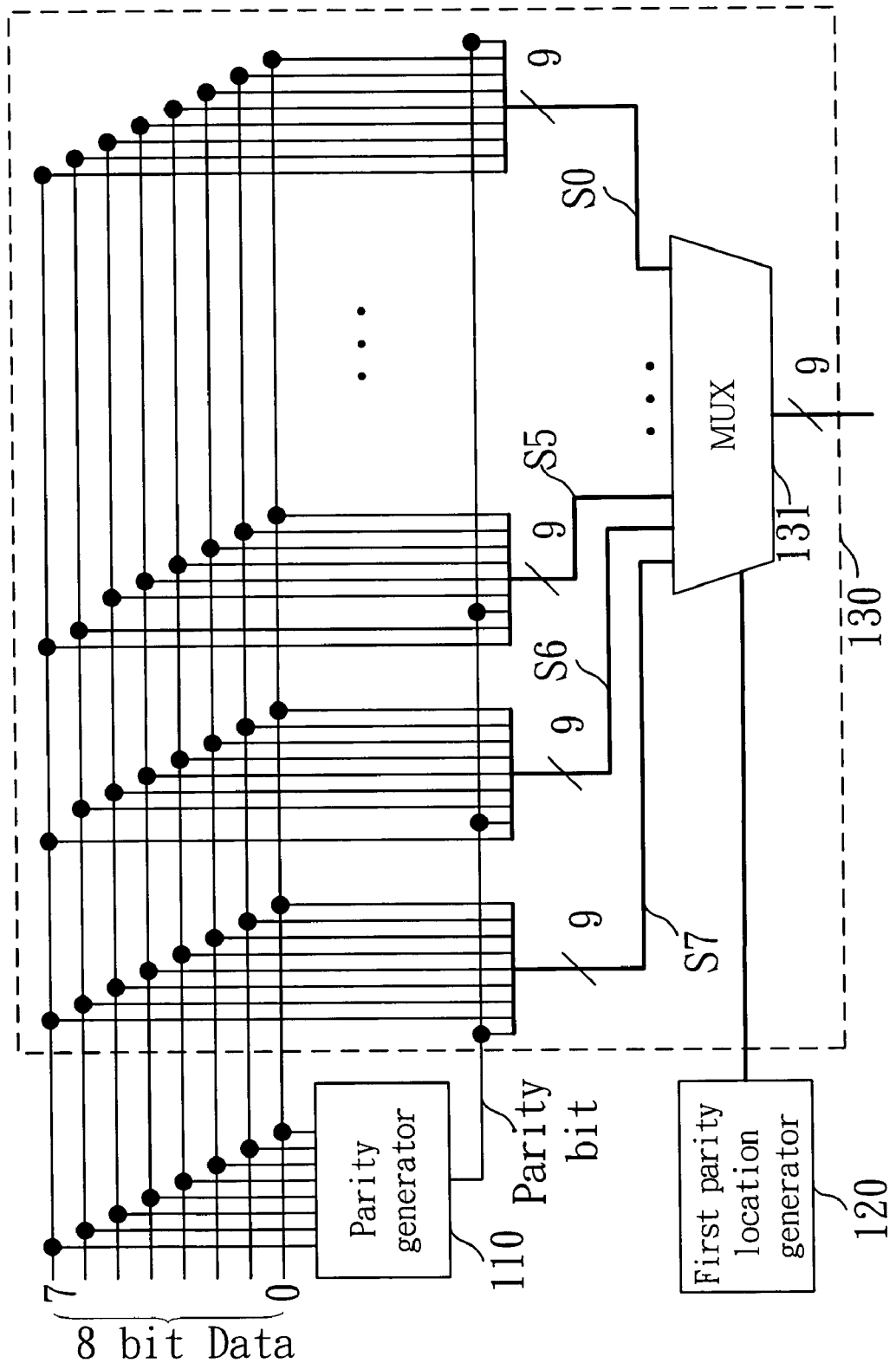
FIG. 2 is a circuit of the parity-inserting unit of FIG. 1 in accordance with the invention.

FIG. 2 is a circuit of the parity-inserting unit 130 of FIG. 1 in accordance with the invention. As shown, signal S7 is a 9-bit encrypted data after the parity bit is inserted in the 8-bit data at 8th-bit, signal S6 is a 9-bit encrypted data after the parity bit is inserted in the 8-bit data at 7th-bit, signal S5 is a 9-bit encrypted data after the parity bit is inserted in the 8-bit data at 6th-bit, and so on.

When the first parity location generator 120 generates an inserting position of 6, which represents that the parity bit is inserted between 6th- and 5th-bit of the 8-bit data, and a multiplexer 131 selects the 9-bit encrypted data at signal S5 to output. Similarly, when the first parity location generator 120 generates an inserting position of 0, which represents that the parity is inserted in 0th-bit of the 8-bit data, and the multiplexer 131 selects the 9-bit encrypted data at signal S0 to output. As such, the parity bit can be inserted in the data at any desired position.

Figure 3:
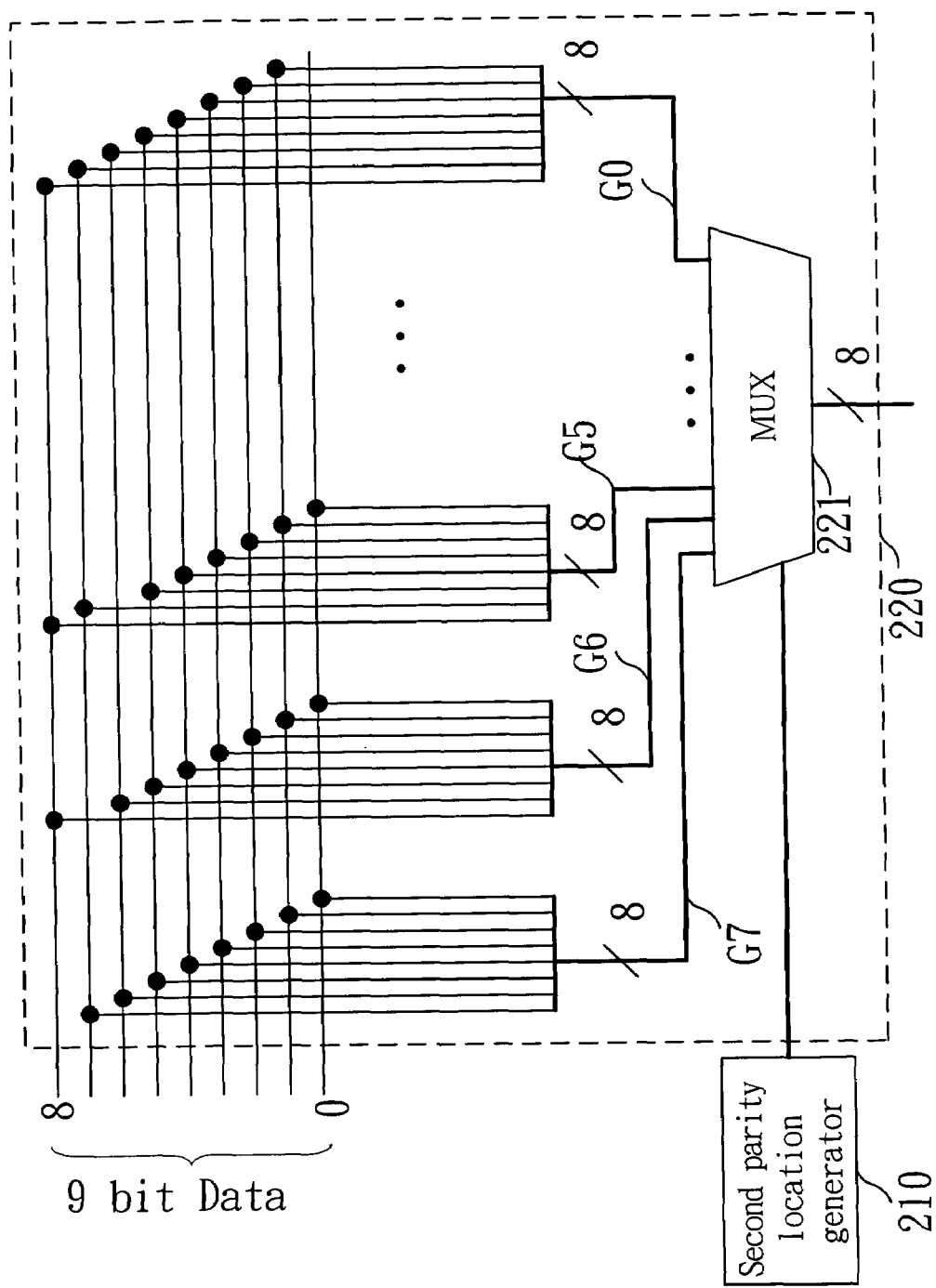
FIG. 3 is a circuit of the parity-removing unit of FIG. 1 in accordance with the invention.

FIG. 3 is a circuit of the parity-removing unit 220 of FIG. 1 in accordance with the invention. As shown, signal G7 is an 8-bit decrypted data after the parity bit is removed from 8th-bit of the 9-bit encrypted data, signal G6 is an 8-bit decrypted data after the parity bit is removed from 7th-bit, signal G5 is an 8-bit decrypted data after the parity bit is removed from 6th-bit, and so on.

When the second parity location generator 210 generates an inserting position with value of 8, which represents that the parity bit is inserted in 8th-bit of the 9-bit encrypted data, and a multiplexer 221 selects the 8-bit decrypted data at signal G7 to output. Similarly, when the second parity location generator 210 generates an inserting position with value of 0, which represents that the parity is inserted in 0th-bit of the 9-bit encrypted data, and the multiplexer 131 selects the 8-bit decrypted data at signal G0 to output. As such, the parity can be removed from any desired position of the encrypted data.

Figure 4:
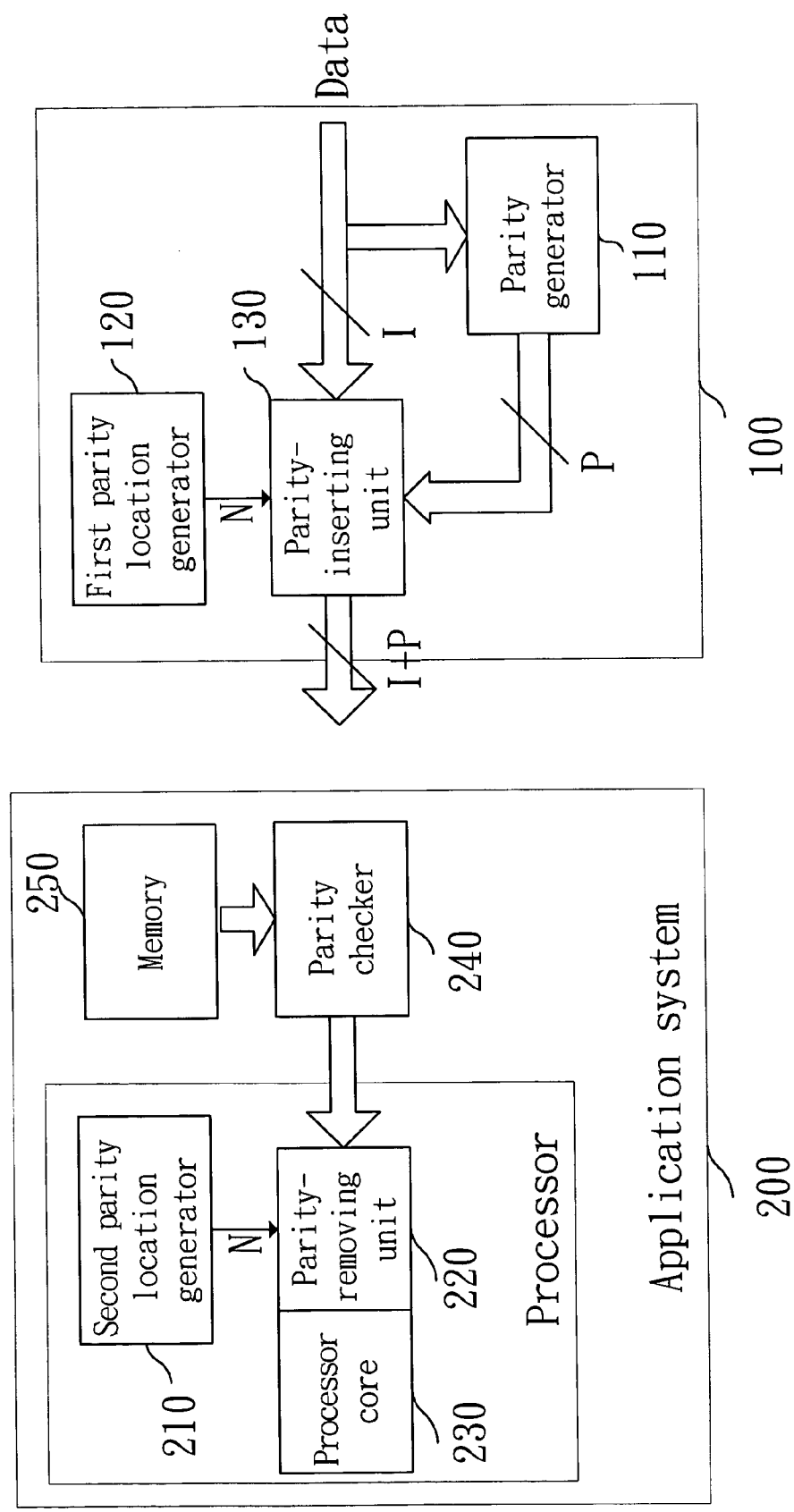
FIG. 4 is a block diagram of an application in accordance with the invention.

FIG. 4 is a block diagram of an application in accordance with the invention. In FIG. 4, an encryption system 100 has a parity generator 110, a first parity location generator 120 and a parity-inserting unit 130. A program with a plurality of bytes (8 bits each) is encrypted by the encryption system 100 to generate a 9-bit encrypted program. This encrypting procedure can be executed off-line.

In addition, an application system 200 has a second parity location generator 210, a parity-removing unit 220, a processor core 230, a parity checker 240 and a memory 250. The 9-bit encrypted program can be stored in the memory 250. Before the processor core 230 reads a program from the memory 250, the parity checker 240 first checks if the parity of the 9-bit encrypted program is right or not. When the parity of the 9-bit encrypted program is not right, an error signal is generated. When the parity of the 9-bit encrypted program is right, the parity-removing unit 220 removes the parity bit from the 9-bit encrypted program in accordance with the inserting position N generated by the second parity location generator 210, thereby obtaining a proper 8-bit program for the processor core 230.

In the present invention, the parity generator 110 is applied to generate the parity. However, other check bit generators such as Error Correcting Code (ECC) device and Cyclic Redundancy Check (CRC) device can be used.

Figure 5:
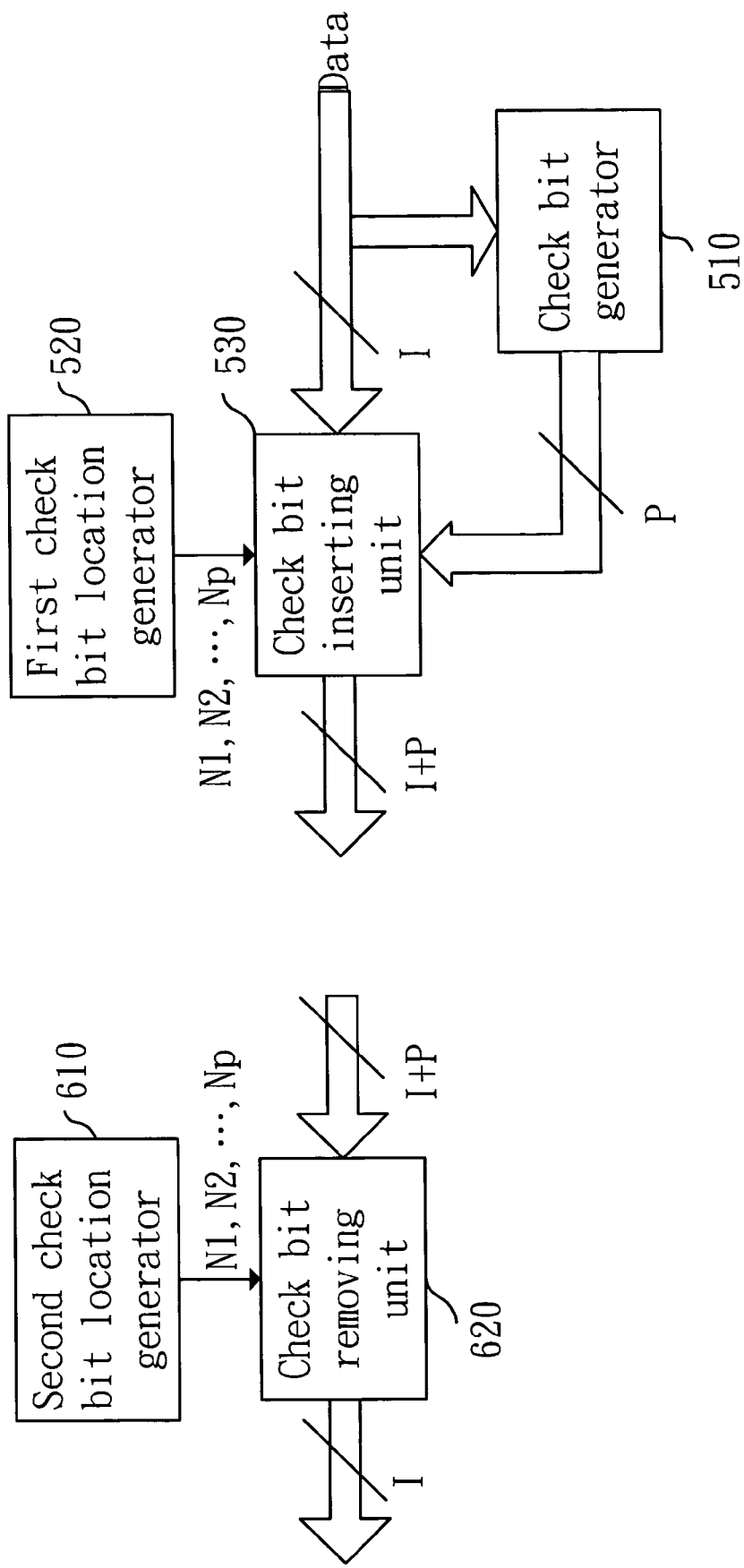
FIG. 5 is a block diagram of another application in accordance with the invention.

FIG. 5 is a block diagram of another application for generating P check bits in accordance with the invention. As shown, it essentially includes a check bit generator 510, a first check bit location generator 520, a check bit inserting unit 530, a second check bit location generator 610 and a check bit removing unit 620.

As shown in FIG. 5, the check bit generator 510 generates P check bits through a check algorithm device in accordance with a data to be outputted, where P is an integer greater than or equal to 1. The check algorithm device can be an ECC device or a CRC device. The first check bit location generator 520 generates inserting positions $N_1, \ldots, N_P$ (an integer respectively for N, P) for the P check bits in accordance with a predetermined algorithm. The check bit inserting unit 530 inserts the P check bits respectively in a position between $(N_x-1)$th- and $(N_x)$ th-bit of the data in accordance with the inserting positions $N_1, \ldots, N_P$ generated by the first check bit location generator 520, where x=1, . . . , P, and thus an encrypted data is generated.

The second check bit location generator 610 generates the inserting positions $N_1, \ldots, N_P$ for the P check bits in accordance with the predetermined algorithm. The check bit removing unit 620 receives the encrypted data and removes the P check bits from the encrypted data in accordance with the inserting positions $N_1, \ldots, N_P$ generated by the second check bit location generator 610. The check bits generated by such check bit generators can be used to encrypt data, without exceeding the scope of the invention.

In view of foregoing, it is known that the invention does not need to use complicated pseudo random generator and thus can save cost. In addition, hardware for generating and removing parities or check bits is very simple, which spends fewer clocks and has better performance than the prior art.

Although the present invention has been explained in relation to its preferred embodiment, it is to be understood that many other possible modifications and variations can be made without departing from the spirit and scope of the invention as hereinafter claimed.

What is claimed is:

1. A device of applying a parity operation to encrypt data for protection, comprising:
   a parity generator, which generates a parity bit in accordance with a data to be outputted, wherein the data has a plurality of bits;
   a first parity location generator, which generates an inserting position N (positive integer) for the parity bit in accordance with a predetermined algorithm; and
   a parity-inserting unit, which inserts the parity bit in a position between (N−1)th- and Nth-bit of the data in accordance with the inserting position N, thereby generating an encrypted data.

2. The device as claimed in claim 1, further comprising:
   a second parity location generator, which generates an inserting position N for the parity bit in accordance with the algorithm; and
   a parity-removing unit, which receives the encrypted data and removes Nth bit of the encrypted data received in accordance with the inserting position N generated by the second parity location generator.

3. The device as claimed in claim 2, wherein the algorithm generates the inserting position by operating a function with a key.

4. The device as claimed in claim 3, wherein the algorithm further generates an integer representing the inserting position by operating a function of right rotation on the inserting position.

5. The device as claimed in claim 3, wherein the algorithm further generates an integer representing the inserting position by operating a function of left rotation on the inserting position.

6. The device as claimed in claim 1, wherein the data has 32 bits.

7. A device of applying check bits to encrypt data for protection, comprising:
   a check bit generator, which generates P check bits through a check algorithm device in accordance with a data to be outputted, where P is an integer greater than or equal to 1;
   a first check bit location generator, which generates inserting positions $N_1, \ldots, N_P$ (a positive integer respectively for N, P) for the P check bits in accordance with a predetermined algorithm; and
   a check bit inserting unit, which inserts the P check bits respectively in a position between $(N_x-1)$th- and $(N_x)$th-bit of the data in accordance with the inserting positions $N_1, \ldots, N_P$ generated by the first check bit location generator, where $x=1, \ldots, P$, thereby generating an encrypted data.

8. The device as claimed in claim 7, further comprising:
   a second check bit location generator, which generates inserting positions $N_1, \ldots, N_P$ for the P check bits in accordance with the algorithm; and
   a check bit removing unit, which receives the encrypted data and removes the P check bits from the encrypted data received in accordance with the inserting positions $N_1, \ldots, N_P$ generated by the second check bit location generator.

9. The device as claimed in claim 7, wherein the check algorithm device is a parity check device.

10. The device as claimed in claim 7, wherein the check algorithm device is an ECC device.

11. The device as claimed in claim 7, wherein the check algorithm device is a CRC device.

12. The device as claimed in claim 7, wherein the algorithm generates the inserting positions respectively by operating a function with a key.

13. A method of applying a parity to encrypt data for protection, comprising the steps of:
   (A) generating a parity bit in accordance with a data to be outputted, wherein the data has a plurality of bits;
   (B) generating an inserting position N (positive integer) for the parity in accordance with a predetermined algorithm; and
   (C) inserting the parity bit in a position between (N−1)th- and Nth-bit of the data in accordance with the inserting position N generated at step (B), thereby generating an encrypted data.

14. The method as claimed in claim 13, further comprising the steps of:
   (D) inputting the encrypted data;
   (E) generating an inserting position N for the parity bit in accordance with the algorithm; and
   (F) removing Nth bit of the encrypted data in accordance with the inserting position N generated at step (E).

15. The method as claimed in claim 13, wherein the algorithm generates the inserting position by operating a function with a key.

16. The method as claimed in claim 15, wherein the algorithm further generates an integer representing the inserting position by operating a function of right rotation on the inserting position.

17. The method as claimed in claim 15, wherein the algorithm further generates an integer representing the inserting position by operating a function of left rotation on the inserting position.

18. The method as claimed in claim 13, wherein the data has 32 bits.

19. A method of applying check bits to encrypt data for protection, comprising the steps of:
   (A) generating P check bits through a check algorithm device in accordance with a data to be outputted, where P is an integer greater than or equal to 1;
   (B) generating inserting positions $N_1, \ldots, N_P$ (a positive integer respectively for N, P) for the P check bits in accordance with a predetermined algorithm; and
   (C) inserting the P check bits respectively in a position between $(N_x-1)$th- and $(N_x)$th-bit of the data in accordance with the inserting positions $N_1, \ldots, N_P$ generated at step (B), where $x=1, \ldots, P$, thereby generating an encrypted data.

20. The method as claimed in claim 19, further comprising the steps of:
   (D) inputting the encrypted data;
   (E) generating inserting positions $N_1, \ldots, N_P$ for the P check bits in accordance with the algorithm; and
   (F) removing the P check bits from the encrypted data input in accordance with the inserting positions $N_1, \ldots, N_P$ generated at step (E).

21. The method as claimed in claim 19, wherein the check algorithm uses parity check.

22. The method as claimed in claim 19, wherein the check algorithm uses ECC.

23. The method as claimed in claim 19, wherein the check algorithm uses CRC.

24. The method as claimed in claim 19, wherein the algorithm generates the inserting positions respectively by operating a function with a key.

* * * * *